(12) United States Patent
Fu et al.

(10) Patent No.: US 10,764,588 B2
(45) Date of Patent: Sep. 1, 2020

(54) DEEP QUALITY ENHANCEMENT OF ADAPTIVE DOWNSCALED CODING FOR IMAGE COMPRESSION

(71) Applicant: Apple Inc., Cupertino, CA (US)

(72) Inventors: Xiang Fu, Mountain View, CA (US); Linfeng Guo, Cupertino, CA (US); Haiyan He, Saratoga, CA (US); Wei Li, Cupertino, CA (US); Xu Gang Zhao, Cupertino, CA (US); Hao Pan, Sunnyvale, CA (US); Xiaohua Yang, San Jose, CA (US); Krishnakanth Rapaka, San Jose, CA (US); Munehiro Nakazato, San Jose, CA (US); Haitao Guo, San Jose, CA (US)

(73) Assignee: APPLE INC., Cupertino, CA (US)

( * ) Notice: Subject to any disclaimer, the term of this patent is extended or adjusted under 35 U.S.C. 154(b) by 47 days.

(21) Appl. No.: 16/100,310

(22) Filed: Aug. 10, 2018

(65) Prior Publication Data
US 2020/0053362 A1    Feb. 13, 2020

(51) Int. Cl.
*H04N 19/176* (2014.01)
*H04N 19/126* (2014.01)
*G06T 7/13* (2017.01)
*G06N 3/08* (2006.01)

(52) U.S. Cl.
CPC ............. *H04N 19/176* (2014.11); *G06N 3/08* (2013.01); *G06T 7/13* (2017.01); *H04N 19/126* (2014.11); *G06T 2207/20081* (2013.01)

(58) Field of Classification Search
USPC ........................................ 375/240.01, 240.12
See application file for complete search history.

(56) References Cited

U.S. PATENT DOCUMENTS

| | | | |
|---|---|---|---|
| 5,598,354 A | * | 1/1997 | Fang ............... G06N 3/0454 708/203 |
| 8,422,546 B2 | | 4/2013 | Lin et al. |
| 8,588,313 B2 | | 11/2013 | Choi et al. |
| 9,251,431 B2 | | 2/2016 | Doepke et al. |

(Continued)

FOREIGN PATENT DOCUMENTS

WO    2017/055609 A1    4/2017

*Primary Examiner* — Behrooz M Senfi
(74) *Attorney, Agent, or Firm* — BakerHostetler (57) ABSTRACT

Techniques are disclosed for coding image data adaptively at different levels of downscaling. Such techniques may involve partitioning input data into pixel blocks for coding and performing content analysis on the pixel blocks. The pixel blocks may be input to block coders that operate at different pixel block sizes, which may code the pixel blocks input to them at their respective sizes. Except when a block coder operates at the partitioning size, block coders that operate at different pixel block sizes may perform downscaling of the pixel blocks to match their size with the block coders' respective coding size. A block decoder may invert the coding operations performed by the block coders, decoding coded image data at respective pixel block sizes, then upscaling decoded image data obtained therefrom to a common pixel block size. Image reconstruction may synthesize a resultant image from the decode pixel block data output by the decoders. Quality enhancements may be added by neural network processing systems that have been trained to other segmented images.

22 Claims, 4 Drawing Sheets

(56) References Cited

U.S. PATENT DOCUMENTS

| | | | |
|---|---|---|---|
| 10,484,717 B2* | 11/2019 | Ye | H04N 19/157 |
| 2008/0068446 A1* | 3/2008 | Barkley | H04N 7/147 |
| | | | 348/14.07 |
| 2013/0272621 A1* | 10/2013 | Lasserre | G06T 9/00 |
| | | | 382/233 |
| 2014/0010294 A1* | 1/2014 | Ye | H04N 19/70 |
| | | | 375/240.12 |
| 2015/0229967 A1* | 8/2015 | Lee | H04N 19/30 |
| | | | 375/240.02 |
| 2016/0007032 A1* | 1/2016 | Alshina | H04N 19/59 |
| | | | 375/240.02 |
| 2016/0050423 A1* | 2/2016 | Alshina | H04N 19/503 |
| | | | 375/240.12 |
| 2018/0350110 A1* | 12/2018 | Cho | G06N 3/0454 |
| 2019/0244394 A1* | 8/2019 | Gueguen | H04N 19/186 |

* cited by examiner

DEEP QUALITY ENHANCEMENT OF ADAPTIVE DOWNSCALED CODING FOR IMAGE COMPRESSION

BACKGROUND

The present disclosure relates to coding of image content, for example, in still-image and motion picture image data.

Image coding generally refers to compression of image data to achieve bandwidth compression. Typically, image coding exploits spatial and, in the case of motion picture content, temporal redundancies in data. When redundancies are identified, redundant content may be coded differentially with respect to other, previously-coded content, which achieves compression. Oftentimes, source image data is partitioned into spatial regions, called "pixel blocks" for convenience, and searches for redundancies are performed on a pixel block by pixel block basis.

Still other compression operations may be performed. In one technique, pixel values within pixel blocks may be converted to frequency coefficients by, for example, a discrete cosine transform or a discrete sine transform. These coefficients may undergo quantization and entropy coding. Quantization often incurs data losses that cannot be recovered during inverse quantization operations. In such applications, decoding operations are likely to generate reconstructed image data that resembles source image data with some errors. In many cases, the errors may be perceptible to human viewers as errors, called "artifacts" for convenience.

Coding protocols have been developed to adaptively select the sizes of the pixel blocks that will be coded. Improper selection of pixel block sizes can be disadvantageous and create artifacts that are easily perceived by viewers.

DETAILED DESCRIPTION

Aspects of the present disclosure provide techniques for coding image data adaptively at different levels of downscaling. Such techniques may involve partitioning input data into pixel blocks for coding and performing content analysis on the pixel blocks. The pixel blocks may be input to block coders that operate at different pixel block sizes, which may code the pixel blocks input to them at their respective sizes. Except when a block coder operates at the partitioning size, block coders that operate at different pixel block sizes may perform downscaling of the pixel blocks to match their size with the block coders' respective coding size. A block decoder may invert the coding operations performed by the block coders, decoding coded image data at respective pixel block sizes, then upscaling decoded image data obtained therefrom to a common pixel block size. Image reconstruction may synthesize a resultant image from the decode pixel block data output by the decoders. Quality enhancements may be added by neural network processing systems that have been trained to other segmented images.

Figure 1:
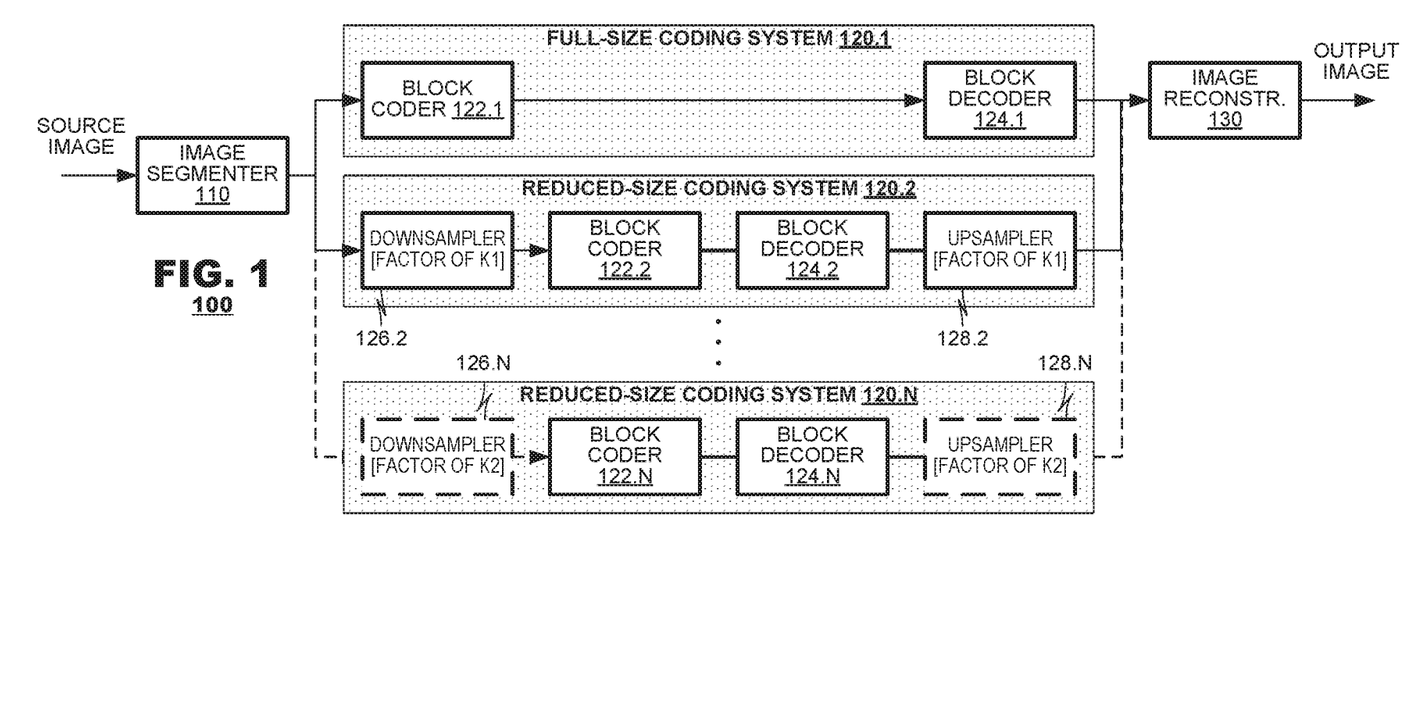
FIG. 1 is a functional block diagram of a training system according to an aspect of the present disclosure.

FIG. 1 is a functional block diagram of a training system 100 according to an aspect of the present disclosure. The system 100 may include an image segmenter 110, a plurality of coder systems 120.1-120.N, and an image reconstruction unit 130. The image segmenter 110 may parse source images into pixel blocks and route each pixel block to a respective coder 120.1, 120.2, ..., 120.N. The coder systems 120.1, 120.2, ..., 120.N each may code input pixel blocks at a respective block size, downsampling them as necessary, decode the coded pixel blocks obtained therefrom, and return them to their original size. The image reconstruction unit 130 may form reconstructed images from the decoded pixel block data output from the coders 120.1, 120.2, ..., 120.N.

The image segmenter 110 may parse source images into spatial arrays of image data ("pixel blocks" for convenience) at predetermined sizes. The pixel block sizes may be selected to match a block size of a coder 120.1 that operates at full size. For example, for a coder 120.1 that operates according to the ITU-T H.265 (commonly, "HEVC") coding protocol, pixel blocks may be size to match a size of a largest coding unit supported by that protocol (64×64 pixels). For a coder 120.1 that operates according to the ITU-T H.264 (commonly, "AVC") coding protocol, pixel blocks may be size to match a size of a pixel blocks coded by that protocol (16×16 pixels). For coders that use other protocols, pixel block sizes may be selected to match the block sizes for those protocols.

The image segmenter 110 may route the parsed pixel blocks to one of the coder systems 120.1, 120.2, ..., 120.N based on an analysis of content contained within each such pixel block. For example, the image segmenter 110 may perform structured edge detection or object detection on content of the pixel block. If the image segmenter 110 determines that content of a pixel block contains content strongly corresponding to edges or corresponding to a predetermined object (e.g., human face(s)) the image segmenter 110 may route the pixel block to a coder 120.1 that codes pixel blocks at full size. If the image segmenter 110 determines that the content of a pixel block does not contain edge content or a predetermined object, the image segmenter 110 may route the pixel block to a coder 120.2 that codes pixel blocks at reduced size.

The coding systems 120.1, 120.2, ..., 120.N each may code pixel block, then decode the pixel block data. To that end, each coding system 120.1, 120.2, ..., 120.N may include a block coder 122.1, 122.2, ..., 122.N and a block decoder 124.1, 124.2, ..., 124.N. A first coding system 120.1 may code the pixel blocks at the size used by the image segmenter 110 to parse the source image (called "full size," for convenience). Another coding system 120.2 may code pixel blocks at a reduced size; it may possess a downsampler 126.2 that reduces the size of the pixel blocks by a predetermined factor K1 prior to image coding and an upsampler 128.2 that increases the size of reconstructed pixel blocks after decode by the same factor K1. Thus, the reduced-sized coding system 120.2 may output reconstructed pixel blocks having the same size as the size of pixel blocks output by the coding system 120.1 even though the coder and decoder 122.2, 124.2 of that coding system 120.2 operates at pixel block sizes smaller than the pixel block sizes used by the full-size coding system 120.1.

If it is desired to provide coding systems at other levels of downsampling, then other coding systems (only one other system 120.N is shown in FIG. 1) may be provided, having a block coder 122.N, block decoder 124.N, downsampler 126.N and upsampler 128.N. The downsampler 126.N and the upsampler 128.N may operate by another sampling factor K2.

The image reconstruction unit 130 may generate reconstructed images from the pixel blocks output by the various coding systems 120.1, 120.2, . . . , 120.N. The image reconstruction unit 130 may reorganize reconstructed pixel blocks according to the spatial orientation of their counterparts in the source image. Optionally, the reconstruction unit 130 may perform image filtering operations such as deblocking filtering, SAO filtering, etc. to minimize pixel block-based artifacts in an output image.

In an aspect, the source images and output images generated by the system 100 of FIG. 1 may be used to train neural network systems for the purpose of assessing circumstances when pixel blocks may be coded by reduced-size coding system(s) 120.2, 120.N, which typically lead to lower bitrate coding than coding by a full-size coding system 120.1 and other circumstances when pixel blocks should be coded by a full-size coding system 120.1. Training is discussed in connection with FIG. 4 hereinbelow.

Figure 2:
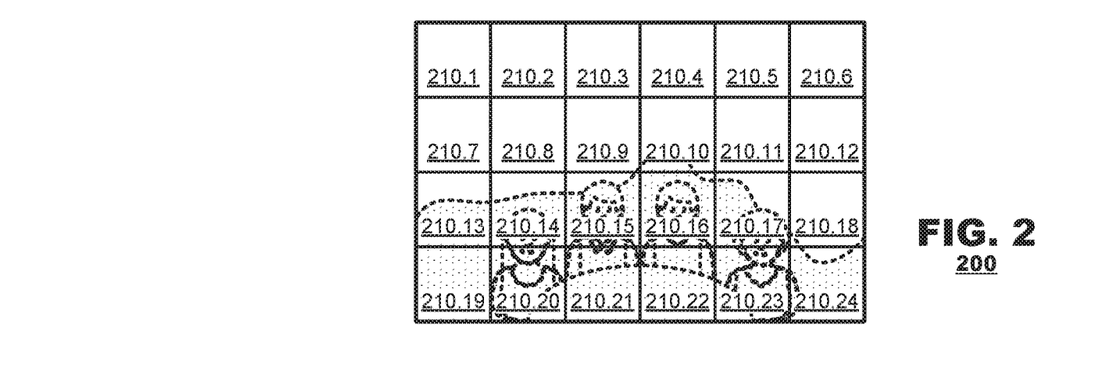
FIG. 2 illustrates an exemplary frame parsed into pixel blocks.

FIG. 2 illustrates an exemplary frame 200 parsed into pixel blocks 210.1-210.24. As indicated, each pixel block 210.1, 210.2, . . . , 210.24 represents a portion of the source frame 200 at a predetermined size.

Figure 3:
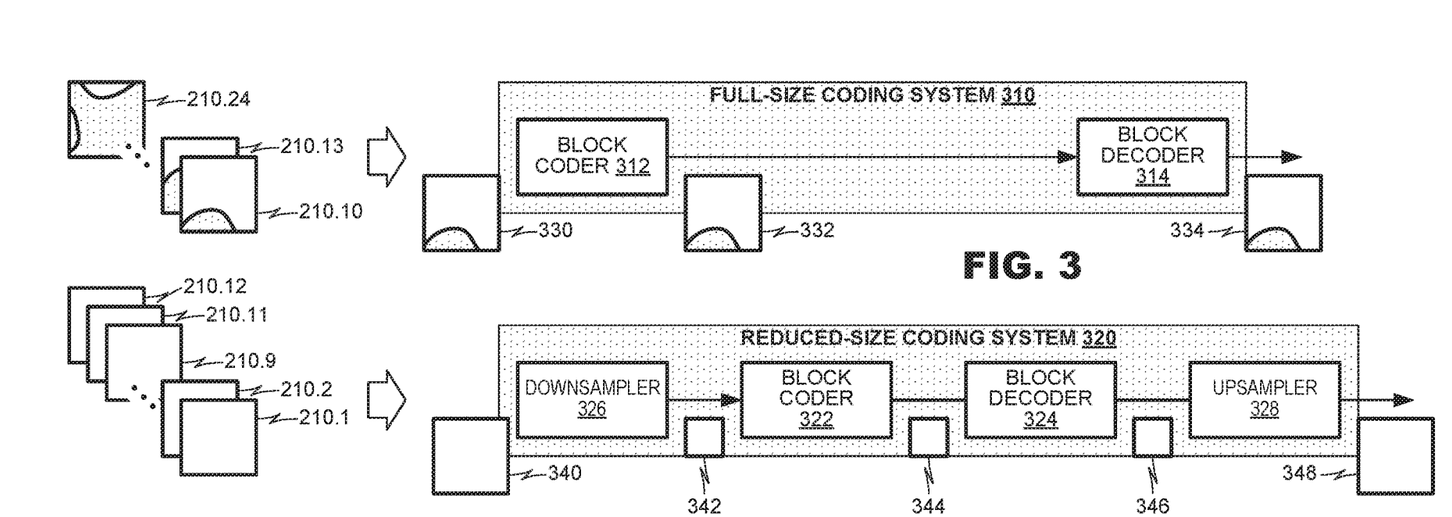
FIG. 3 illustrates exemplary image coding that may be applied to the pixel blocks illustrated in FIG. 2.

FIG. 3 illustrates exemplary image coding that may be applied to the pixel blocks 210.1-210.24 of FIG. 2. In this example, each pixel block 210.1, 210.2, . . . , 210.24 may be coded by one of two coding systems: a full-size coding system 310 or a reduced-size coding system 320. As its name implies, the full size coding system 310 may include a block coder 312 and a block decoder 314 to code input pixel blocks at their full size. The reduced-size coding system 320 may include a block coder 322, a block decoder 324, downsampler 326 and upsampler 328.

During operation, a first set of pixel blocks 210.1-210.9, 210.11-210.12 may be designated for coding by the full size coding system 310. Each pixel block may be coded at its parsed size. Thus, when pixel block 210.10 is input to the full-size coding system 310, it may be input as its initial size (represented by block 330), coded at this size (block 332) and decoded at this same size (block 334). When a pixel block 210.1 is input to the reduced-size coding system 320, the pixel block may be input at its initial size (represented by block 340), reduced to a second size by the downsampler 326 (block 342), coded at the reduced size (block 344), decoded at the reduced size (block 324) and increased back to its original size by the upsampler 328 (block 348).

Figure 4:
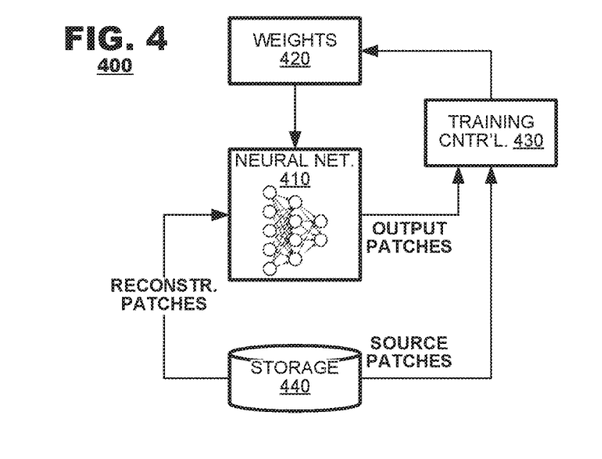
FIG. 4 is a functional block diagram of a training system for a neural network according to an aspect of the present disclosure.

FIG. 4 is a functional block diagram of a training system 400 for a neural network according to an aspect of the present disclosure. The system 400 may include a neural network 410, an array of network weights 420, a training controller 430, and storage 440 for patch pairs of image data (original image data and reconstructed image data). The training system 400 may generate weights from a plurality of training images that are processed by the system 100 of FIG. 1.

The storage 440 system may store patches of image data representing source images processed by the system 100 of FIG. 1 and the reconstructed images obtained therefrom. Patches typically are regions of image data taken from the source images and their reconstructed counterparts. For example, if a patch is taken from a predetermined pixel location of a source image, a source patch may be taken from a block of data (say, 72 pixels by 72 pixel) surrounding that pixel location. A patch also will be taken from the reconstructed image from a block of data having the same size at the same location as the patch of the source image.

The neural network 410 may be trained by applying reconstruction patches at an input of the neural network 410. The neural network 410 may apply modifications of each reconstruction patch according to weights 420 then-defined for the neural network 410. The neural network 410 may generate output data, called an "output patch" for convenience, having a size corresponding to the size of the source and reconstruction patches.

The training controller 430 may compare the output patch generated by the neural network 410 to the source patch that corresponds to the reconstruction patch that was applied to the neural network 410. Based on differences between the source patch and the output patch, the training controller 430 may revise weight(s) 420 that govern the neural network's operation.

Training operations may be performed over a large data set (storage 440) of source patches and reconstruction patches. Training operations may continue until a set of weights 420 are developed that minimize errors between the output patches and the source patches over the training set of patches. When such weights are developed, they may be stored for use in run-time coding and decoding, discussed in connection with FIGS. 5 and 6 hereinbelow.

Figure 5:
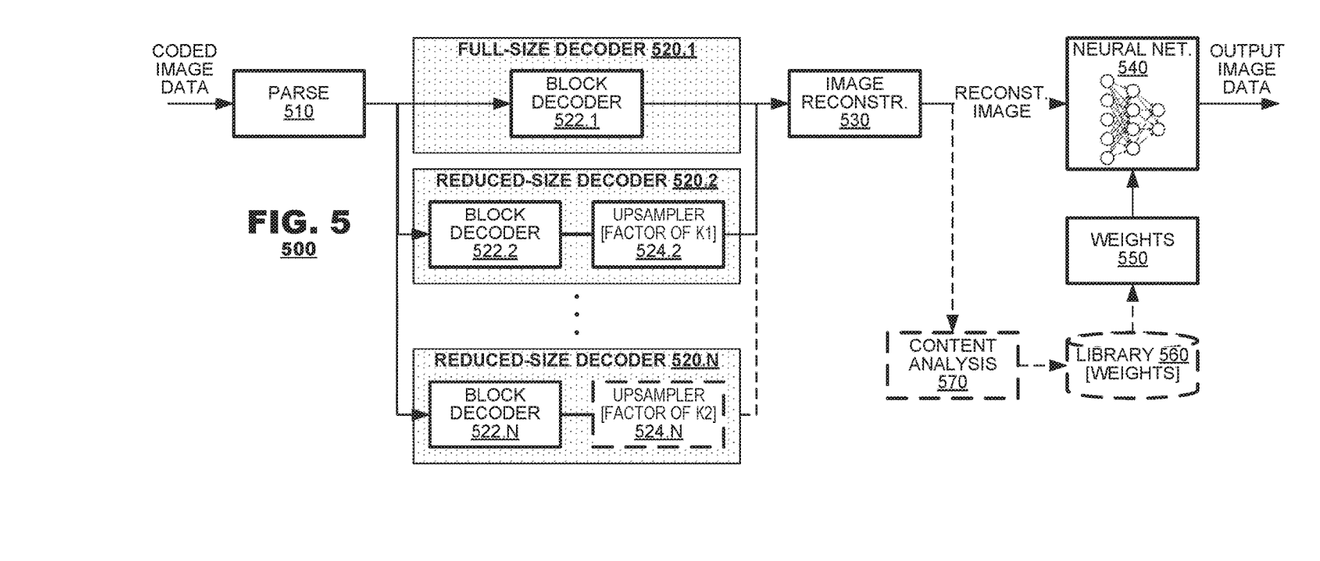
FIG. 5 illustrates a decoding system according to an aspect of the present disclosure.

FIG. 5 illustrates a decoding system 500 according to an aspect of the present disclosure. The system 500 may include a parsing unit 510, a plurality of decoder systems 520.1, 520.2, . . . , 520.N, an image reconstruction unit 530, a neural network 540, and an array of weights 550 for the neural network 540.

The parsing unit 510 may receive coded image data from a channel that represents pixel blocks that have been coded at different resolutions. The parsing unit 510 may identify the coded image data of each pixel block and route it to a respective decoder system 520.1, 520.2, . . . , 520.N for decoding.

The decoding systems 520.1, 520.2, . . . , 520.N each may decode coded pixel block data at a respective pixel block size. To that end, each decoding system 520.1, 520.2, . . . , 520.N may include a block decoder 522.1, 522.2, . . . , 522.N that decodes pixel blocks at a respective size. A first decoding system 520.1 may code the pixel blocks at their native, full size. Another decoding system 520.2 may decode pixel blocks at a reduced size; it may possess an upsampler 524.2 that increases the size of reconstructed pixel blocks after decode by a scale factor K1 to generate reconstructed pixel blocks having the same size as the size of pixel blocks output by the coding system 520.1. Optionally, other coding systems (e.g., system 520.N) may be provided to operate on coded pixel blocks at other sizes; upsamplers 524.N in the other systems would operate by other sampling factors (e.g., K2).

The image reconstruction unit 530 may generate reconstructed images from the pixel blocks output by the various coding systems 520.1, 520.2, . . . , 520.N. The image reconstruction unit 530 may reorganize reconstructed pixel blocks according to their spatial orientation within the reconstructed image; such orientation may be identified in the coded image data received by the parsing unit 510. Optionally, the reconstruction unit 530 may perform image filtering operations such as deblocking filtering, SAO filtering, etc. to minimize pixel block-based artifacts in a reconstructed image.

The neural network 540 may receive patches of the reconstructed image as inputs and may generate corresponding patches of an output image in response. The neural network 540 may operate according to the weights 550 defined for the neural network 540 during training (e.g., as in FIG. 4). During operation, patches may be taken from the reconstructed image having a same size as the patches that were used during training. The neural network 540 may generate patches in response. The patches output from the neural network 540 may be reassembled into an output image through another reconstruction unit (not shown).

Optionally, the system 500 may have different sets of weights defined for different content objects in image data. Returning to FIG. 4, the training system 400 may train the neural network 440 using a first type of image content (say, human faces) and, once the network is trained to convergence, a first array of weights may be stored. Thereafter, the training system 400 may train the neural network 440 using a second type of image content (say, trees) and, once the network is trained to convergence, a second array of weights may be stored that is independent of the first array. The training process may be performed for as many types of content as may be desired. Alternatively, several neural networks (not shown) may operate in parallel to each other, each trained to a respective type of content.

Returning to FIG. 5, a decoding system 500 may include a content analyzer 570 that identifies predetermined types of content to which the neural network 540 has been trained (e.g., objects such human faces, bodies, or trees, structured edge detection, saliency detection, region-of-interest detection, etc.). When the content analyzer 570 identifies a registered type of content in a reconstructed image, the content analyzer 570 may retrieve from a storage unit 560 representing a library of weights, an array of weights corresponding to the detected content and may reconfigure the neural network 540 according to the retrieved weights. The content analyzer 570 may detect several different types of objects within a common image and may cause corresponding arrays of weights to be applied for content corresponding to each such object.

Figure 6:
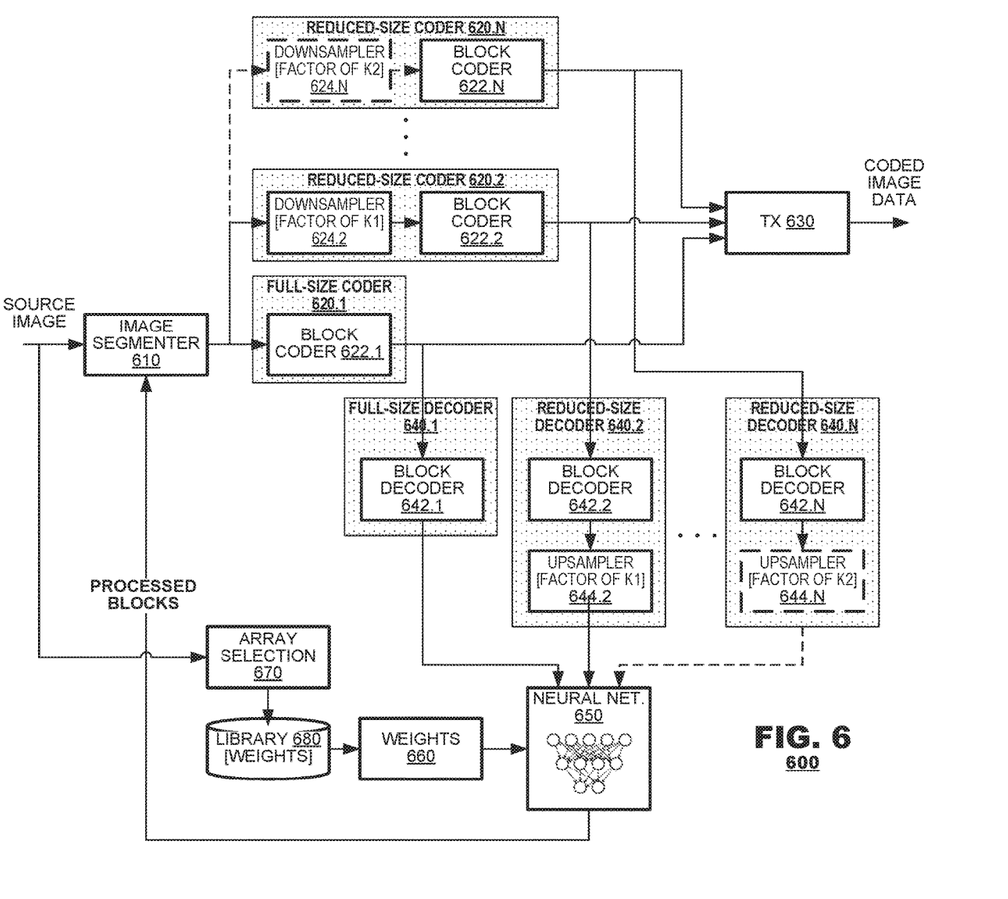
FIG. 6 illustrates an encoding system according to an aspect of the present disclosure.

FIG. 6 illustrates an encoding system 600 according to an aspect of the present disclosure. The system 600 may include: an image segmenter 610, a plurality of block-based coder systems 620.1, 620.2, ..., 620.N, and a transmitter 630.

The image segmenter 610 may parse source images into pixel blocks at predetermined sizes. As with the aspect of FIG. 1, the pixel block sizes may be selected to match a block size of a coder 620.1 that operates at full size. For example, for a coder 620.1 that operates according to the ITU-T H.265 (commonly, "HEVC") coding protocol, pixel blocks may be size to match a size of a largest coding unit supported by that protocol (64×64 pixels). For a coder 620.1 that operates according to the ITU-T H.264 (commonly, "AVC") coding protocol, pixel blocks may be size to match a size of a pixel blocks coded by that protocol (16×16 pixels). For coders that use other protocols, pixel block sizes may be selected to match the block sizes for those protocols.

The image segmenter 610 also may route each pixel block to one of the coder systems 620.1, 620.2, ..., 620.N based on analysis of content contained within each such pixel block. For example, the image segmenter 610 may perform structured edge detection on content of the pixel blocks or object detection. If the image segmenter 610 determines that content of a pixel block contains content strongly corresponding to edges or corresponding to a predetermined object (e.g., human face(s)) the image segmenter 610 may route the pixel block to a coder 620.1 that codes pixel blocks at full size. If the image segmenter 610 determines that the content of a pixel block does not contain edge content or a predetermined object, the image segmenter 610 may route the pixel block to a coder 620.2 that codes pixel blocks at reduced size.

The coders 620.1, 620.2, ..., 620.N each may code pixel block data, then decode the pixel block data. To that end, each coder 620.1, 620.2, ..., 620.N may include a block coder 622.1, 622.2, ..., 622.N and, with the exception of the full-size coder 620.1, a downsampler 624.2, ... 624.N. The first coder 620.1 may code the pixel blocks at their full size. Another coder 620.2 may code pixel blocks at a reduced size; it may possess a downsampler 624.2 that reduces the size of the pixel blocks by a predetermined factor K1 to match a coding size used by its block coder 622.2. Thus, the reduced sized coder 620.2 may output coded pixel blocks having been coded at reduced sizes with respect to the block coding size of the full-size coder 620.1. It is expected that coding rates of the pixel blocks coded by the block coder 622.2 will be reduced than if those same pixel blocks were coded by the full-size block coder 622.1.

If it is desired to provide coders at other levels of downsampling, then other coders (only one other system 620.N is shown in FIG. 6) may be provided, having a block coder 622.N and downsampler 624.N. The block coder 622.N codes input pixel blocks at a respective size, different from the coding sizes used by the block coders 622.1 and 622.2. The downsampler 624.N may operate by another sampling factor K2 to reduce the sizes of the pixel blocks to match the coding size used by the block coder 622.N.

The transmitter 630 may transmit coded data of the pixel blocks to a channel. The transmitter 630 may format the coded image data according to a governing coding protocol and may include metadata identifying, for example, spatial locations of the coded pixel blocks within each image.

The coding system 600 may employ a local decoding loop to decode coded data generated by the coders 610.1, 620.2, ..., 620.N, which may generate reference blocks that are used for prediction operations when coding later-received blocks. The decoders 640.1, 640.2, ..., 640.N each may decode coded pixel block data at a respective pixel block size. To that end, each decoder 640.1, 640.2, ..., 640.N may include a block decoder 642.1, 642.2, ..., 642.N that decodes pixel blocks at a respective size. A first decoder 640.1 may code the pixel blocks at their native, full size. It operates as a counterpart to the coder 620.1. Other decoders 640.2, ..., 640.N may be provided as counterparts to coders 620.2, ... 620.N. Thus, the decoder 640.2 may decode pixel blocks at the reduced size employed by the coder 620.2; it may possess a block decoder 620.2 that decodes the coded pixel blocks at this size, and an upsampler 644.2 that increases the size of reconstructed pixel blocks after decode by a scale factor K1 to match the size as the pixel blocks output by the decoder 640.1. Similarly, the other decoders (e.g., decoder 640.N) may be provided to decode coded pixel blocks at other sizes by respective block decoders 642.N. Upsamplers 644.N in the other systems would operate by other sampling factors (e.g., K2) to increase the size of decoded pixel blocks to match the size of blocks output by the full-size decoder 640.1.

Optionally, a coding system 600 may employ neural networks in the decoding loop to process decoded blocks output by the decoders 640.1, 640.2, ..., 640.N. To that end, the coding system 600 may include a neural network 650, an array of weights 660 for the neural network 650, an array selection unit 670, and storage 680 for a library of weights.

The neural network 650 may receive patches of the reconstructed blocks as inputs and may generate corresponding patches of an output block in response. The neural network 650 may operate according to the weights 660 defined for the neural network 650 during training (e.g., as in FIG. 4), which modifies input patches based on the weights 660.

The patches of the reconstructed blocks or the patches output from the neural network 650 may be output to the image segmenter 610 where they are reassembled into processed blocks. The processed blocks may be used as reference blocks for predictive coding operations performed by the coders 620.1-620.N.

The library 680 stores various different weight arrays that may be output (as weights 660) to govern operation of the neural network 650. In an embodiment, a weight selector 670 may compare performance of the neural network 650 under different weight arrays for a given portion of coded image data and may identify a weight array that minimizes image artifacts as compared to the source images of the image data. When such a weight array is found, the weight selector 670 may cause the transmitter 630 to include an identifier of the weight array in the coded image data of the respective portion (path not shown in FIG. 6). On decode (FIG. 5), a corresponding weight array may be output from storage 560 and applied to the neural network 540 when decoding the image data.

The foregoing discussion has described operation of the aspects of the present disclosure in the context of image coders and decoders. Commonly, these components are provided as electronic devices. Image decoders and/or controllers can be embodied in integrated circuits, such as application specific integrated circuits, field programmable gate arrays and/or digital signal processors. Alternatively, they can be embodied in computer programs that execute on camera devices, personal computers, notebook computers, tablet computers, smartphones or computer servers. Such computer programs typically are stored in physical storage media such as electronic-, magnetic- and/or optically-based storage devices, where they are read to a processor and executed. Decoders commonly are packaged in consumer electronics devices, such as smartphones, tablet computers, gaming systems, DVD players, portable media players and the like; and they also can be packaged in consumer software applications such as video games, media players, media editors, and the like. And, of course, these components may be provided as hybrid systems that distribute functionality across dedicated hardware components and programmed general-purpose processors, as desired.

Image coders and decoders may exchange coded image data through channels in a variety of ways. They may communicate with each other via communication and/or computer networks. In still other applications, image coders may output coded image data to storage devices, such as electrical, magnetic and/or optical storage media, which may be provided to decoders sometime later. In such applications, the decoders may retrieve the coded image data from the storage devices and decode it.

The foregoing discussion applies both to systems that perform still image compression, such as HEIF and/or JPEG compression systems and the like and to system that perform motion video compression such as HEVC- and/or AVC-based compression systems.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

Several embodiments of the invention are specifically illustrated and/or described herein. However, it will be appreciated that modifications and variations of the invention are covered by the above teachings and within the purview of the appended claims without departing from the spirit and intended scope of the invention.

We claim:

1. An image decoding method, comprising:
    decoding coded pixel blocks representing a source image, the decoding including:
        decoding a first group of the coded pixel blocks at a first pixel block size,
        decoding a second group of the coded pixel blocks at a second pixel block size, smaller than the first, and
        resizing the decoded second group of pixel blocks from the second pixel block size to the first pixel block size;
    forming a reconstructed image from the first and second groups of decoded pixel blocks of the source image; and
    passing the reconstructed image through a neural network.

2. The method of claim 1, further comprising:
    performing content analysis on the reconstructed image, and
    when an object of a predetermined type is detected in the reconstructed image, applying to the neural network a set of weights associated with the object of the predetermined type.

3. The method of claim 1, wherein the neural network includes a plurality of sub-networks, each to operate on the reconstructed image and each trained to a respective type of image content.

4. The method of claim 1, further comprising applying to the neural network a set of weights identified in coded data of the source image.

5. An image decoding system, comprising:
    a plurality of block decoders, each decoder associated with pixel blocks coded at a respective block size, and each decoder having an output for decoded pixel block data at a common block size;
    an image reconstruction unit, having inputs coupled to respective outputs of the block decoders and an output for a reconstructed image formed from the decoded pixel block data of the respective block decoders; and
    a neural network, having an input coupled to an output of the image reconstruction unit.

6. The system of claim 5, further comprising:
    storage for a library of different sets of weights for the neural network, and
    a content analyzer having an input coupled to an output of the image reconstruction unit and an output coupled to the storage to index one of the sets of weights stored therein.

7. The system of claim 5, further comprising storage for a library of different sets of weights for the neural network, the storage indexed by a weight identifier provided in coded data of a source image.

8. An image coding method, comprising:
    partitioning a source image into a plurality of pixel blocks;
    selecting, based on content of each pixel block, one of a plurality of coders to code the pixel block, each coder to code pixel blocks at a respective pixel block size;
    coding, at each coder, pixel block(s) input it at the coder's respective pixel block size, the coding including, for coders that operate at pixel block sizes different than the partitioning pixel block sizes, scaling the input pixel block(s) to match the coder's respective pixel block size; and transmitting coded image data of the pixel blocks to a plurality of decoders.

9. The method of claim 8, further comprising:
decoding the coded image data of the pixel blocks, each at its respective coding size;
upsampling the decoded pixel block data as needed to size(s) to a common size;
passing the pixel blocks at the common size through a neural network.

10. The method of claim 9, wherein an output block assembled from output of the neural network becomes a candidate reference block for use in prediction operations by the coders.

11. The method of claim 9, wherein the common pixel block size is a largest pixel block size used among the coders.

12. The method of claim 8, wherein the selecting comprises:
performing structured edge detection on the source image, and
routing each pixel block to a selected coder based on edge(s) detected therein.

13. The method of claim 8, wherein the selecting comprises:
performing object detection performed on the source image, and
routing each pixel block to a selected coder based on objects(s) detected therein.

14. The method of claim 9, further comprising applying to the neural network a set of weights identified in coded data of the source image.

15. The method of claim 8, wherein one of the plurality of coders comprises a downsampler having an input for a pixel block, and a block coder to code pixel block data at a size determined by the downsampler.

16. The method of claim 8, wherein one of the plurality of decoders comprises a decoder to decode pixel block data at a downsampled pixel block size, and an upsampler having an input for a decoded pixel block.

17. A coding system, comprising:
a plurality of block-based coding systems,
each coding system having inputs for pixel blocks at a common size,
each coding system comprising a block coder to code pixel blocks at a respective pixel block size,
at least one coding system of the coding systems having a downsampler, the downsampler provided at its input the pixel blocks and its output coupled to its block coder;
an image segmenter, having an input for a source image, and outputs to each of the coding systems, the image segmenter parses the source image into a plurality of pixel blocks, performs content analysis on each pixel block, and routes each pixel blocks to one of the coding systems based on the content analysis.

18. The system of claim 17, wherein the content analysis is structured edge detection.

19. The system of claim 17, wherein the content analysis is object detection.

20. The system of claim 17, further comprising a transmitter to transmit coded image data obtained from the coding systems to a channel.

21. The system of claim 17, further comprising a plurality of block-based decoding systems, each associated with a respective coding system of the block-based coding systems, each block-based decoding system having a block decoder to decode pixel blocks at a respective block size, at least one block-based decoding system having an upsampler coupled to an output of its block decoder.

22. A neural network training system, comprising:
a plurality of image coding systems;
each coding system having inputs for pixel blocks at a common size,
each coding system comprises a block coder and a block decoder adapted to code an image at a respective pixel block size, and
at least one image coding system having a downsampler and an upsampler, the downsampler provided at its input the pixel blocks and having an output coupled to its block coder, the upsampler provided at its input decoded pixel blocks from its block decoder;
a neural network having an input for reconstructed pixel blocks from the plurality of image coding systems, an output for modified pixel blocks, and an input for network weights;
a training controller adapted to apply the reconstructed pixel blocks from the image coding systems to the input of the neural network, to compare data at the output of the neural network to input pixel blocks corresponding to the reconstructed pixel blocks, and to adjust the network weights based on the comparison.

* * * * *